(12) United States Patent
Bertani

(10) Patent No.: US 11,167,399 B2
(45) Date of Patent: Nov. 9, 2021

(54) MANOEUVERING ELEMENT INCORPORATING TORQUE LIMITING MEANS

(71) Applicant: ELESA S.p.A., Milan (IT)

(72) Inventor: Alberto Bertani, Milan (IT)

(73) Assignee: ELESA S.P.A., Milan (IT)

( * ) Notice: Subject to any disclaimer, the term of this patent is extended or adjusted under 35 U.S.C. 154(b) by 399 days.

(21) Appl. No.: 16/360,131

(22) Filed: Mar. 21, 2019

(65) Prior Publication Data
US 2019/0308303 A1    Oct. 10, 2019

(30) Foreign Application Priority Data
Apr. 5, 2018 (IT) .................... 102018000004238

(51) Int. Cl.
| | | |
|---|---|---|
| *B25B 23/142* | (2006.01) | |
| *B25B 13/06* | (2006.01) | |
| *B25B 23/16* | (2006.01) | |
| *F16D 7/08* | (2006.01) | |
| *F16K 31/60* | (2006.01) | |
| *G05G 5/02* | (2006.01) | |
| *G05G 1/10* | (2006.01) | |

(52) U.S. Cl.
CPC ............ *B25B 23/142* (2013.01); *B25B 13/06* (2013.01); *B25B 23/16* (2013.01); *F16D 7/08* (2013.01); *F16K 31/60* (2013.01); *G05G 5/02* (2013.01); *G05G 1/10* (2013.01)

(58) Field of Classification Search
CPC ... B25B 23/142; B25B 23/1427; B25B 23/16; F16D 7/022; F16D 7/024; F16D 7/005; F16K 31/60
See application file for complete search history.

(56) References Cited

U.S. PATENT DOCUMENTS

| | | | |
|---|---|---|---|
| 4,549,716 A | 10/1985 | Warren | |
| 4,860,992 A | 8/1989 | Aunspach | |
| 8,714,056 B2* | 5/2014 | Landowski | ........... B25B 23/141 81/474 |
| 9,555,526 B1* | 1/2017 | Gauthier | ............... B25B 23/142 |
| 10,279,146 B2* | 5/2019 | Ivinson | .................. B25B 23/18 |
| 10,343,269 B2* | 7/2019 | Nino | .................. B25B 23/0035 |

FOREIGN PATENT DOCUMENTS

DE    20 2014 100349 U1    2/2014

OTHER PUBLICATIONS

Search Report for Italian Patent Application No. 102018000004238 dated Nov. 6, 2018.

* cited by examiner

*Primary Examiner* — David B. Thomas
(74) *Attorney, Agent, or Firm* — Pearne & Gordon LLP

(57) ABSTRACT

Manoeuvering flywheel of the type consisting of a main flywheel body composed of a cylindrical base and a crown consisting of a regular series of gripping lobes characterised in that the cylindrical base centrally provides a cylindrical cavity, wherein a septum is located which is centrally perforated, perpendicular to the directrices of the cylindrical cavity, and apt to make up two separate chambers, on the lower surface of which a series of engagement teeth is housed.

10 Claims, 3 Drawing Sheets

MANOEUVERING ELEMENT INCORPORATING TORQUE LIMITING MEANS

FIELD OF THE INVENTION

The present invention relates to a manoeuvering and tightening element which incorporates torque limiting means.

BACKGROUND OF THE INVENTION

Manoeuvering and tightening elements have been known for a long time and for a great variety of uses and applications—especially, but not exclusively on machines and machineries. They are constituted by a handle body, typically with a cylindrical base and provided with shaping apt to favour the engagement with one hand, to which a pin is associated—perpendicular to the supporting plane—equipped with engagement means for the stable connection to a shaft, for a comfortable control or adjustment manoeuver.

Typically, the operator—once the manouvering and tightening element has been assembled—acts very easily on the handle body, rotating the handle body clockwise or counterclockwise, tightening or releasing the element to which it is held in engagement. Said handle body has the shape of a flywheel, and it will be defined in such a manner during the description below.

However, it has been found that it is often difficult to identify the maximum allowable torque in everyday practice, i.e. the torque beyond which the engagement area is subjected to an overload, with the consequent risk of premature wear and breakage. In practice, problems arise during the tightening step, because, by forcing it, there is the risk of deforming—albeit imperceptibly—the abutment surfaces, with the consequent imprecise contact between them.

BRIEF SUMMARY OF THE INVENTION

It is easy to understand that it is strong the request to safely limit the tightening torque, and therefore to adopt, and improve, a device that allows not exceeding a predetermined torque value.

It is therefore an object of the present invention to realize a manoeuvering flywheel which is able to reduce the aforementioned negative effects, in particular which is able to limit the torque and consequently reduce the risk of rapid wear and malfunctions.

Such object is achieved by a manoeuvering flywheel having the features defined in claim 1). The secondary claims concern improved properties, which are meritorious to be highlighted.

BRIEF DESCRIPTION OF THE DRAWINGS

The invention will now be more described in greater detail, by way of example only, with reference to the accompanying drawings, wherein.

DESCRIPTION OF EXAMPLE EMBODIMENTS

Figure 1:
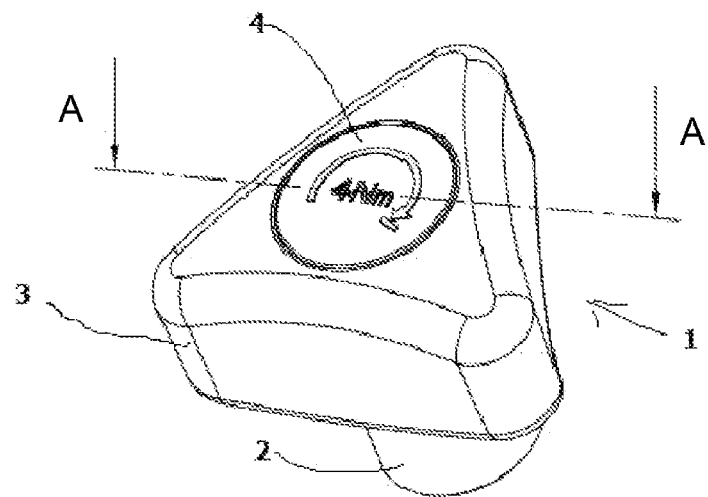
FIG. 1 is a perspective view of the flywheel according to the invention.

As illustrated in FIG. 1, the flywheel according to the invention is composed of a main body of the flywheel 1, typically made of plastic, consisting of a cylindrical base 2 and a crown 3 composed of a regular series of gripping elements, as, in the case illustrated by way of example, three lobes.

Figure 2:
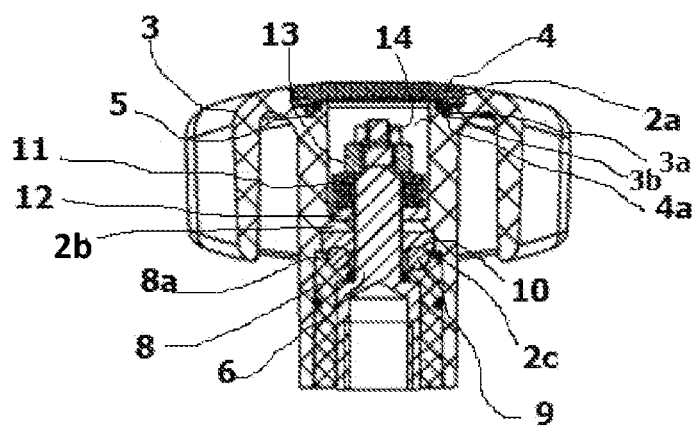
FIG. 2 is a sectional view along the line A-A of FIG. 1.
Figure 3:
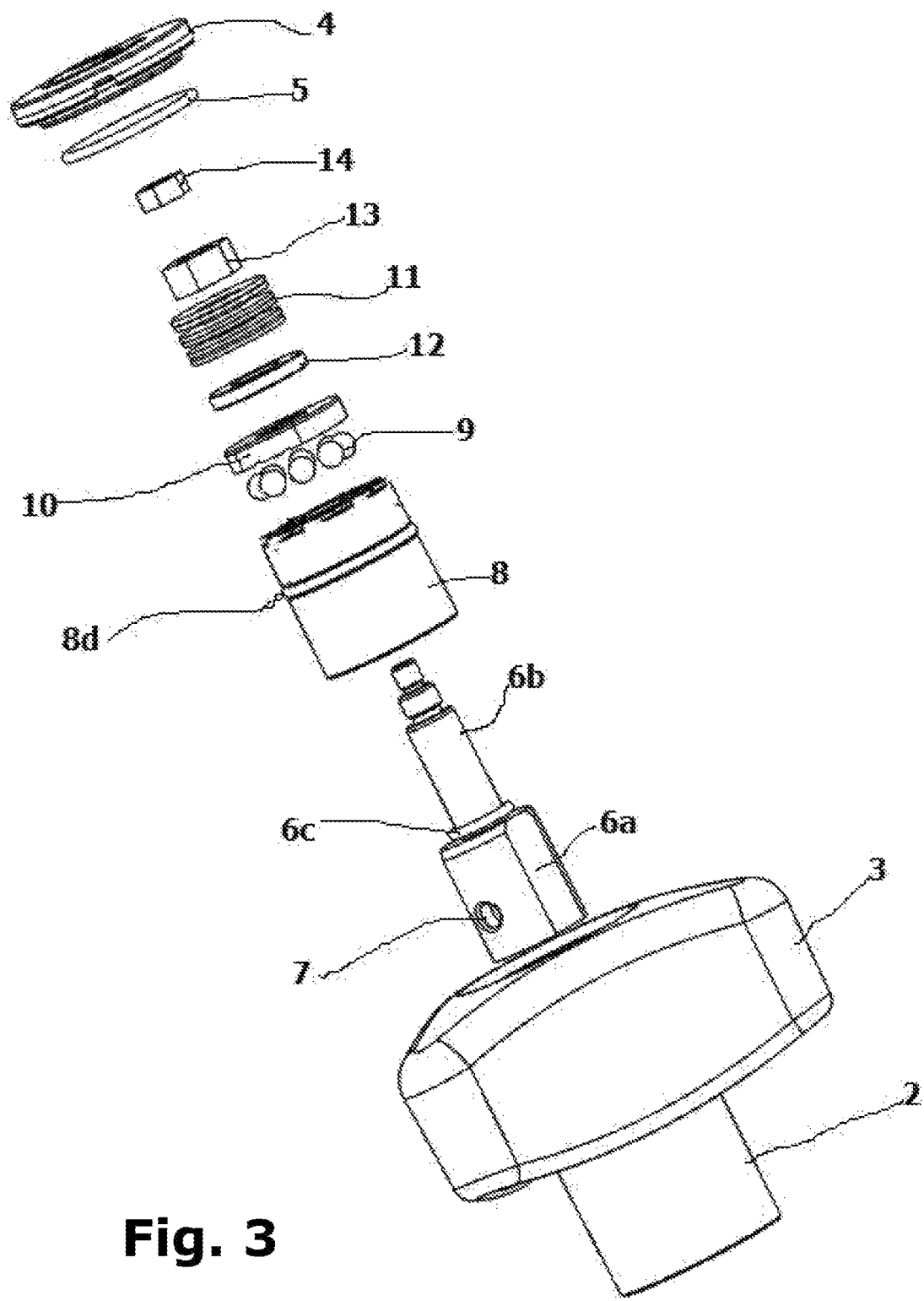
FIG. 3 is an exploded view of the flywheel of FIG. 1.
Figure 4:
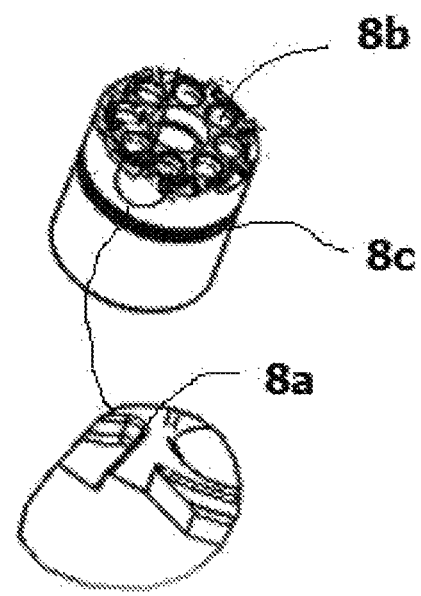
FIG. 4 is a top perspective view of a particular element forming part of the invention according to the disclosure.
Figure 5:
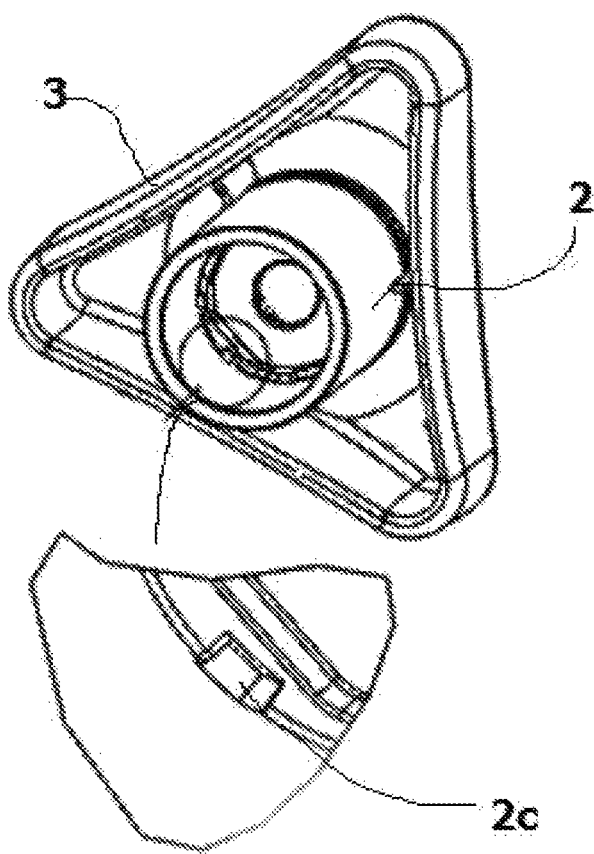
FIG. 5 is a perspective bottom view of a further and different particular element forming part of the invention according to the disclosure.

The flywheel structure is better illustrated in FIG. 2, wherein the base 2 is identified, which centrally provides a cylindrical cavity in 2a, without a centrally perforated septum 2b, and apt to constitute two separate chambers, arranged perpendicular with respect to the directrices of the said cylindrical cavity 2a. On the bottom surface of said septum 2b a series of engagement teeth 2c is housed, having a substantially rectangular-trapeze-like profile. At the top of the above-said cylindrical base—limiting the crown area and at the same time obtained therein—there is an annular channel 3a which partly deepens to the side of the above-said base 2 and which provides a further seat 3b which deepens about in the middle of the channel itself. Channel 3a and related seat 3b house a customizable dome 4 for the closing of the said cylindrical cavity 2a, provided with an annular ribbing 4a which protrudes from the lower surface of the said dome 4. In correspondence of the seat 3b of the channel 3a—and more precisely between the edge of the said cylindrical cavity 2a and ribbing 4a a sealing O-ring 5 is inserted.

Within the said cylindrical cavity 2a of the flywheel 1 now described, and forming part thereof, an engagement and manoeuvering structure is housed consisting of a pin 6, in turn consisting of a basal portion 6a with a major diameter provided along the wall of a hole 7 for housing engagement and constraint means to the structure to be manoeuvered (not shown) and a summit portion 6b with a minor diameter on which an O-ring 6c for sealing a bush 8 which is in contact with the summit surface of said base portion 6a is provided. Said bush 8 has some morphological peculiarities, i.e., along the upper perimeter line it has a series of engagement teeth 8a having a rectangular-trapeze-like profile, between one tooth and the other being internally provided housings with a circular base 8b for housing steel spheres 9 and along the lateral profile it has a central groove 8c for housing an o-ring 8d. A shaped track 10, provided with symmetrical outlets 10a for the sealing of the spheres 9 and for the engagement with the lower surface of said septum 2b is also in engagement with the above-said pin 6.

A Belleville washer (11) associated with said pin 6—and housed in the upper chamber of the cavity 2a—arranged between a dampening shim block 12 brought in contact with the upper surface of said septum 2b and a tightening nut-lock nut pair 13, 14 arranged for winding the said Belleville washer 11 while ensuring the vibration strength is furthermore provided.

The flywheel now described can be considered as constituted by two different sections, i.e. a mobile section integral with the main body and a fixed section and in direct connection with the structure to be manoeuvered.

The mobile section integral with the main body consists of the body composed of the base 2, the crown 3 and the dome 4 associated with the shaped track 10. Therefore, the fixed section is composed of the pin 6, the housing 8 provided at its top with the spheres 9 and the Belleville washer 11, with the related associated elements, i.e. the thickness 12 and the nuts 13 and 14.

At the lower surface of the septum 2b, the channel 2 is shaped in order to house the shaped track 10 in a constrained manner, and thus ensure the rotation of the track itself.

During the assembly, the operator takes care of contacting the bush 8 with the pin 6, so that it is in stable contact with the head of the portion 6a, the O-ring 6c ensuring the seal of the assembly. To further ensure the seal and the correct position of the bush in the constructed movement system, it is envisaged that the gasket 8c defines the correct projection of the bush 8 with respect to the septum 2b and ensures the required seal. Subsequently, the operator inserts the spheres 9 into the housings 8b of the bush and covers them by means of the shaped track 10. Once this step has been completed, the operator inserts the assembly into channel 2a, taking care that the shaped track is in contact with the lower surface of the septum 2b.

At this point, it is possible to insert the thickness 12, from above, into the channel 2a, which is in contact with the upper surface of the said septum 2b, and the Belleville washer 11, then the operator regulates the compression thereof by means of the nut-lock nut system 13, 14. Once these operations have been completed, he inserts the dome 4, together with the O-ring 5, in position and in seat to close the device by means of simple pressure and snap hooking.

The flywheel is now ready to be fixed to the device on which it has to be mounted.

During operation, the transmission of the torque between the movable part and the structure to which the flywheel is mounted is ensured by the presence of the spheres 9, until the torque remains below the predetermined release value during the calibration step of the Belleville washer 11. Once the selected maximum torque has been reached, the Belleville washer 11 is compressed, causing the base 2 to lift, together with the track 10, the interchangeable thickness 12, the dome 4 and the O-ring 5. In this way, the disengagement of the track 10 with respect to the spheres 9 occurs, and consequently the flywheel terminates its tightening function, and only its rotation corresponds to the possible stress of the flywheel without a torque increase. With this solution the certainty that at the end of the tightening is also obtained, i.e. when the trip nominal torque is reached, no unwanted unscrewing of the flywheel occurs, e.g. due to vibrations or other factors which increase the tightening torque.

On the contrary, the unscrewing can take place exclusively thanks to the engagement of the teeth 2c provided along the perimeter of the lower surface of the septum 2a with the teeth 8a formed along the perimeter of the summit surface of the said housing 8. As anticipated, they have been suitably shaped so as not to work during screwing, but to offer the plane against plane contrast when the unscrewing takes place. Thus, the unscrewing abutment is given by the engagement of teeth, which were not stressed during the screwing step and, therefore, are not subject to wear. In this way, during unscrewing, there is the certainty of a much greater torque than during screwing and there is the certainty of the correct operation of the product to which the flywheel is associated in every instant and condition.

It is also appropriate to highlight the fact that the spheres are integral with the structure to which the flywheel is kept constrained by the fact that they are held within the housing 8, which is not dynamically loaded, as held in engagement with the structure, and consequently it is not subject to any kind of wear, which has made it possible to realize the housing 8 in plastic material during the design step.

On the contrary, it was considered necessary and appropriate to arrange the track 10 made of extremely hard and resistant material, such as e.g. 100Cr6 steel with hardening at 62-65 HRC, in order to increase the fatigue strength of the product.

Finally, in order to improve the result of the invention, it was decided to realize the crown 3 with a negative draft to improve the ergonomics of the tightening and, in this way, favour the tightening and untightening operations to the operator.

The structure now described can obtain a different adjustment of the torque to be exerted, modifying the number of Belleville washers 11 or the thickness of the thickness 12.

To ensure the correct resistance, the elements with the greatest risk of wear or stress are preferably made of steel and, therefore, typically the steel pin 6, the spheres 9, the shaped track 10 and the Belleville washers 11, the thickness 12, besides—understandably the two nuts 13 and 14. For the rest, the preferred material is a plastic material.

As anticipated, in the figures a specific preferred embodiment is represented. Therefore, in the figures a three-lobe structure is represented for convenience, but this is an exclusively decorative choice, and not a structural one.

For example, in the figures a female pin 6 is illustrated: however, the pin 6 can be constrained to the structure to be manoeuvered also by male threading, without thereby creating any problem for the correct operation of the flywheel.

Moreover, in the chosen embodiment, the crown 3 consists of a three-lobed body. However, it is also easily understandable, also from the following description, that the shape of the crown may be different, e.g. It can have five lobes or a series of semi-cylindrical protrusions, or another solution aesthetically appreciated during the design step, without any change in the scope of the invention.

Other non-substantial modifications may be provided without departing from the scope of protection of the present invention, as defined by the appended claims.

The invention claimed is:

1. Manoeuvering flywheel of the type consisting of a main flywheel body composed by a cylindrical base and of a crown consisting of a regular series of gripping lobes characterised in that said cylindrical base centrally provides a cylindrical cavity, wherein a septum is located which is centrally perforated, perpendicular to directrices of said cylindrical cavity, and apt to make up two separate chambers, on a lower surface of which a series of engagement teeth is housed.

2. The manoeuvering flywheel of claim 1, further characterised in that at the top of the above-said cylindrical base—limiting the crown area and at the same time obtained therein—is an annular channel which partly deepens to the side of the above-said base 2 and which provides a further seat which deepens about in the middle of the channel itself.

3. The manoeuvering flywheel of claim 2, further characterised in that said channel and seat house a dome for the closing of said cylindrical cavity, provided with an annular ribbing which protrudes from the lower surface of said dome.

4. The manoeuvering flywheel of claim 2, further characterised in that in correspondence of said seat—and more precisely between the edge of said cylindrical cavity and ribbing a sealing O-ring is inserted.

5. The manoeuvering flywheel of claim 2, further characterised in that in correspondence of the lower surface of the septum, the channel has a shape apt to constrain the shaped track.

6. The manoeuvering flywheel of claim 1, further characterised in that within said cylindrical cavity of the flywheel an engagement and manoeuvering structure is housed consisting of a pin, in turn consisting of a basal portion with a major diameter provided along the wall with a hole for the housing of engagement and constraint means and of a summit portion with a minor diameter, the summit surface of said basal portion keeping a bush in a stable position.

7. The manoeuvering flywheel of claim 6, further characterised in that said bush has above along the perimeter line engagement teeth, between one tooth and the other housings with a circular base being internally provided for the housing of spheres and along the lateral profile a central groove being provided for the housing of an O-ring.

8. The manoeuvering flywheel of claim 7, further characterised in that said engagement teeth provided in correspondence of the lower surface of said septum and said engagement teeth provided on the upper surface of said housing have a substantially rectangular-trapeze-like profile.

9. The manoeuvering flywheel of claim 6, further characterised in that it has a shaped track engaged with said pin, said shaped track being provided with symmetrical outlets which hold said spheres and are engaged with the lower surface of said septum.

10. The manoeuvering flywheel of claim 6, further characterised in that, associated with said pin and housed in the upper chamber of the cavity—a Belleville washer is furthermore provided arrangedbetween a dampening shim block brought in contact with the uppersurface of said septum and a tightening nut-lock nut pair for the adjustment of said Belleville washer.

* * * * *